United States Patent [19]

Konishi et al.

[11] Patent Number: 5,027,238
[45] Date of Patent: Jun. 25, 1991

[54] FLOATING TYPE MAGNETIC HEAD WITH FLEXURE CUTOUT

[75] Inventors: Takahiro Konishi; Toshihiro Kuriyama, both of Nagaoka, Japan

[73] Assignee: Alps Electric Co., Ltd., Tokyo, Japan

[21] Appl. No.: 564,934

[22] Filed: Aug. 9, 1990

[30] Foreign Application Priority Data

Sep. 27, 1989 [JP] Japan .............................. 1-112930[U]

[51] Int. Cl.⁵ .............................................. G11B 5/48
[52] U.S. Cl. .................................................... 360/104
[58] Field of Search ....................... 360/103, 104, 128

[56] References Cited

U.S. PATENT DOCUMENTS 4,700,250 10/1987 Kuriyama .
4,724,500 2/1988 Dalziel ................................. 360/103
4,868,694 9/1989 Hagen .................................. 360/104
4,901,175 2/1990 Ito et al. ......................... 360/104 X
4,920,438 4/1990 Furukawa et al. .................... 360/104

*Primary Examiner*—John H. Wolff
*Attorney, Agent, or Firm*—Guy W. Shoup; Norman R. Klivans

[57] ABSTRACT

A floating type magnetic head for a magnetic disk drive. A slider, in which a magnetic core is incorporated, is fixed by adhesive to a gimbal with a hole formed on the side of the gimbal in contact with the magnetic core. Deformation of the magnetic core by the adhesive is prevented and the position of the magnetic core with respect to the magnetic disk is stabilized without deforming the magnetic core.

3 Claims, 2 Drawing Sheets

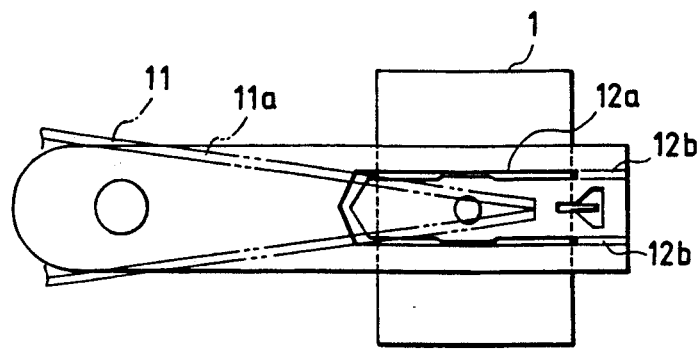
FIG. 1
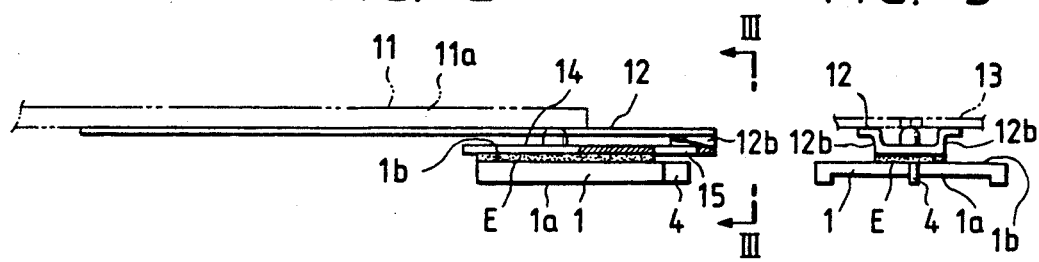
FIG. 2
FIG. 3
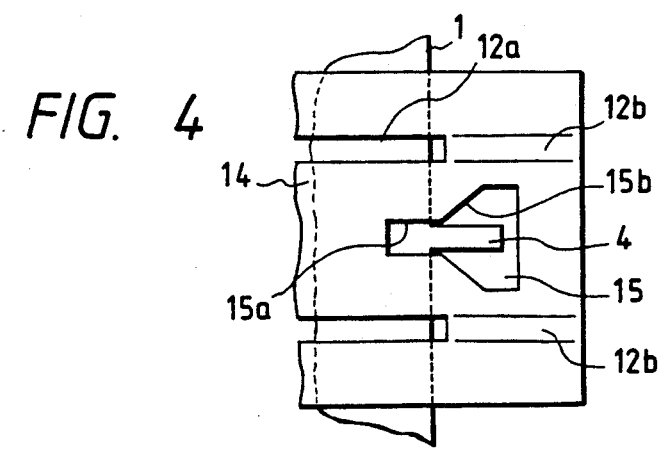
FIG. 4

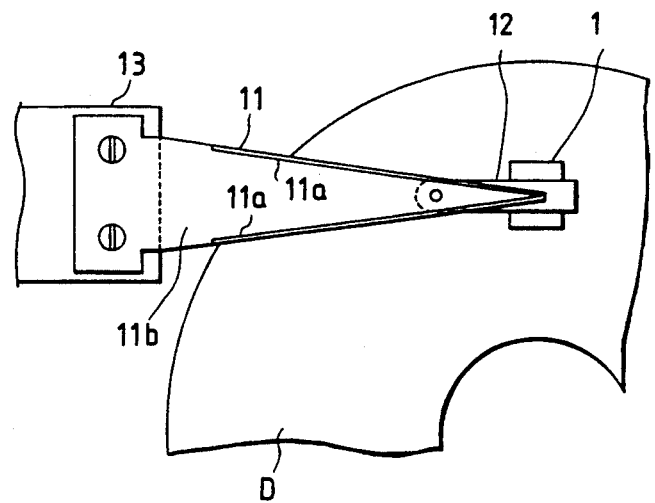
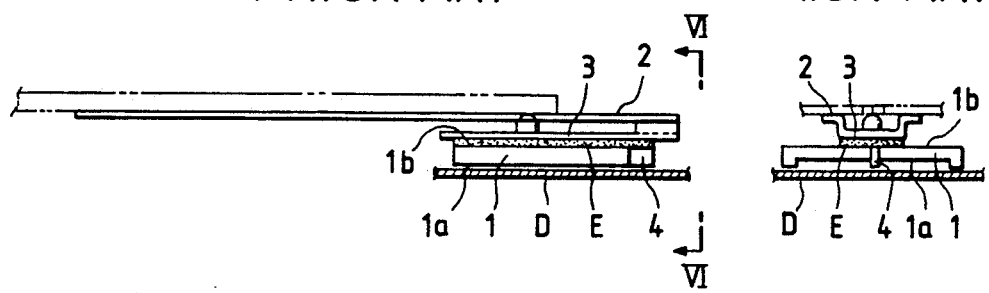

FLOATING TYPE MAGNETIC HEAD WITH FLEXURE CUTOUT

BACKGROUND OF THE INVENTION

1. Field of the Invention:

The present invention relates to a floating type magnetic head which floats slightly apart from a magnetic disk by air flow from above the magnetic head.

2. Description of the Related Art

A magnetic head of this type equipped with a slider 1 for floating has been known, as shown in FIGS. 6 and 7.

That is, the slider 1 has a slide surface 1a by which a floating force is obtained by an air flow in the direction of the rotation produced by the rotation of a magnetic disk D. A surface (rear surface) to be mounted on 1b at the side opposite to this slide surface 1a is fixed to a flexure portion 3 of a gimbal 2 with an adhesive E. The gimbal 2 containing the flexure portion 3 is adapted to apply an spring force to the slider 1 so as to press the slide surface 1a against the magnetic disk D.

A magnetic core 4, on which a coil is wound, is projectedly disposed on the surface to be mounted on 1b in the same plane as the side of the slider 1.

SUMMARY OF THE INVENTION

In the above-mentioned conventional magnetic head, however, since the surface to be mounted on 1b is fixed to the flexure portion 3 with an adhesive E, the adhesive E inevitably invades between the magnetic core 4 and the flexure portion 3, and the magnetic core 4 also becomes fixed to the flexure portion 3. However, since the magnetic core 4 is such that a portion of the slider 1 is protruding, its rigidity is small and therefore it has the disadvantage that only the magnetic core 4 is substantially deformed in the direction the flexure portion 3 side due to shrinkage when the adhesive E is solidified. Such a deformation is likely to be larger when the slider 1 is thinner, as the market demands smaller devices.

The present invention has been devised in light of the above-mentioned circumstances. Accordingly, an object of the present invention is to provide a floating type magnetic head in which a magnetic core is not be deformed by shrinkage when the adhesive E solidifies.

To achieve the above-mentioned object, according to the present invention, a through hole is formed in the gimbal at the position corresponding to the magnetic core in a floating type magnetic head comprising a slider which obtains a floating-up force by air flow coming from a magnetic disk, a plate-spring-like gimbal for fixedly holding the rear side of this slider with an adhesive and pressing the slider to the magnetic disk side, and a magnetic core projectedly formed on the rear side from the peripheral surface of the slider in substantially the same plane.

In the present invention, since a through hole is formed at a position on a gimbal corresponding to the magnetic core adhesive will not invade between the magnetic core and the gimbal. Accordingly, there is no risk that a magnetic core will be deformed due to the shrinkage of an adhesive, and the position of the magnetic core with respect to a magnetic disk is stabilized.

These and other objects, features and advantages of the present invention will become clear when reference is made to the following description of the preferred embodiments of the present invention, together with reference to the accompanying drawings.

BRIEF DESCRIPTION OF THE DRAWINGS

FIGS. 1 to 5 are views illustrating one embodiment of the present invention;

FIG. 1 is a top plan view of a portion of a floating type magnetic head;

FIG. 2 is a side view of a portion of the floating type magnetic head;

FIG. 3 is a perspective view taken along the line III—III of FIG. 2;

FIG. 4 is an enlarged top plan view illustrating a section of a gimbal;

FIG. 5 is a top plan view illustrating a floating type magnetic head;

FIGS. 6 to 7 are views showing an example of the prior art;

FIG. 6 is a top plan view of a portion of a floating type magnetic head; and

FIG. 7 is a perspective view taken along the line VI—VI of FIG. 6.

DETAILED DESCRIPTION OF THE PREFERRED EMBODIMENT

An embodiment of the present invention will be explained with reference to FIGS. 1 to 5. In these figures, components common to the components shown in FIGS. 5 and 6 are given the same symbols and their description is omitted.

FIG. 5 is a top plan view illustrating a floating type magnetic head. A state in which a gimbal 12 and a slider 1 are mounted to the end of an arm 11 is shown.

The front end of the arm 11 is extendedly disposed in the form of an isosceles triangle and the base end section is fixed to a rotary supporting section 13 with screws. On the opposing sides of the front end section excluding the base end section, a rib 11a, which rises up perpendicularly, is formed, and the portion from the rib 11a to the base end section is a flat-plate spring section 11b. A gimbal 12 is fixed to the front end section of the arm 11 at the side opposing the magnetic disk D.

The gimbal 12 is formed from a thin, rectangular plate having a high elastic limit, as shown in FIGS. 1 to 4. A flexure portion 14, which is a tongue-shaped plate spring, is formed by a U-shaped slit 12a extending from a position in the vicinity of the front end section to the base end. A step 12b is formed in the section from both U-shaped ends of the slit 12a to the front end and causes the flexure portion 14 to create a step with respect to the other sections of the gimbal. The slider 1 is fixed to the flexure portion 14 of the gimbal 12 with an adhesive E with the magnetic core 4 facing the front end. A through hole 15 is formed in the flexure portion 14 corresponding to this magnetic core 4. This through hole 15 is formed by a slit 15a having a width a little wider than that of the magnetic core 4 and an expansion hole 15b extending, as its width becomes wider in the section from this through hole 15, to the front end side of the flexure portion 14. The slit 15a is positioned at the slit 12a side rather than the step 12b.

The slider 1 is rectangular and approximately 1 mm in thickness. The surface to be mounted on 1b is fixed to the flexure portion 14 with an adhesive E. At this juncture, it is so mounted that the base section of the magnetic core 4 substantially coincides with the front end of the slit 15a. The magnetic core 4 is a monolithic type on which a coil is wound.

In the floating type magnetic head constructed as described above, the flexure portion 14 is elastically deformed in such a manner to permit its front end to bend back in a clockwise direction by a floating-up force acting on the slider 1, with the portion of the step 12b at the base end acting as a fulcrum. The floating-up force at this juncture acts on the arm 11 via the gimbal 12, and the arm 11 is elastically deformed to bend back in a counterclockwise direction, with the plate spring section 11b as a fulcrum. For this reason, the bending back of the flexure portion 14 and that of the arm 11 cancel each other, and the slide surface 1a of the slider 1 becomes substantially parallel to the magnetic disk D.

The formation of the through hole 15 prevents the adhesive E from invading between the magnetic core 4 and the flexure portion 14. Therefore, the force of the shrinkage when the adhesive E is solidified will not act on the magnetic core 4. As a result, according to the above-mentioned floating type magnetic head, the deformation of the magnetic core 4 caused by the shrinkage of the adhesive E can be prevented, and the position of the magnetic core 4 with respect to the magnetic disk D stabilized.

As has been described above, according to the present invention, since a through hole is formed at the position of the above-mentioned gimbal adhesive is prevented from entering between the magnetic core and the gimbal.

Therefore, the deformation of a magnetic core caused by shrinkage when an adhesive solidifies can be prevented and thus the position of a magnetic core with respect to a magnetic disk stabilized.

Many widely different embodiments of the present invention can be made without departing from the spirit and scope thereof, therefore, it is to be understood that this invention is not limited to the specific embodiments thereof except as defined in the appended claims.

What is claimed is:

1. A floating type magnetic head for a disk drive device, comprising:
   an arm;
   a gimbal having a flexure portion secured to a free end of said arm; and
   a slider having a magnetic core mounted thereon, the slider fixed by an adhesive to said flexure portion of said gimbal, said flexure portion defining a through hole at a part thereof adjacent said magnetic core, thereby preventing the adhesive from contacting the magnetic core.

2. A floating type magnetic head as claimed in claim 1, wherein said through hole has a width greater than that of the magnetic core.

3. A floating type magnetic head as claimed in claim 1, wherein said through hole is wider at a part adjacent a front end of said magnetic core than elsewhere.

* * * * *